(12) United States Patent
Morisaki

(10) Patent No.: US 10,246,075 B2
(45) Date of Patent: Apr. 2, 2019

(54) HYBRID VEHICLE

(71) Applicant: Toyota Jidosha Kabushiki Kaisha, Toyota-shi, Aichi-ken (JP)

(72) Inventor: Keisuke Morisaki, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 25 days.

(21) Appl. No.: 15/470,155

(22) Filed: Mar. 27, 2017

(65) Prior Publication Data

US 2017/0282895 A1 Oct. 5, 2017

(30) Foreign Application Priority Data

Mar. 31, 2016 (JP) ................. 2016-070377

(51) Int. Cl.
| | |
|---|---|
| B60W 20/13 | (2016.01) |
| G01C 21/34 | (2006.01) |
| B60W 10/06 | (2006.01) |
| B60W 10/26 | (2006.01) |
| B60K 6/46 | (2007.10) |
| B60W 20/12 | (2016.01) |
| B60K 6/445 | (2007.10) |
| B60W 50/00 | (2006.01) |
| B60W 10/08 | (2006.01) |

(52) U.S. Cl.
CPC .......... *B60W 20/13* (2016.01); *B60K 6/445* (2013.01); *B60W 10/06* (2013.01); *B60W 10/08* (2013.01); *B60W 10/26* (2013.01); *B60W 20/12* (2016.01); *B60W 50/0097* (2013.01); *G01C 21/3469* (2013.01); *B60W 2510/244* (2013.01); *B60W 2510/246* (2013.01); *B60W 2550/145* (2013.01); *B60W 2710/244* (2013.01); *B60W 2710/246* (2013.01); *B60W 2710/248* (2013.01); *Y02T 10/6239* (2013.01); *Y02T 10/6291* (2013.01); *Y10S 903/93* (2013.01)

(58) Field of Classification Search
CPC ...... B60W 20/13; B60W 20/12; B60W 10/26; B60W 10/06; B60K 6/46
USPC ........................................................ 701/22
See application file for complete search history.

(56) References Cited

U.S. PATENT DOCUMENTS

| | | | |
|---|---|---|---|
| 2003/0231005 A1 | 12/2003 | Kohama et al. | |
| 2009/0319179 A1* | 12/2009 | Mino | G01C 21/26 |
| | | | 701/408 |

(Continued)

FOREIGN PATENT DOCUMENTS

| | | |
|---|---|---|
| JP | 2000032606 A | 1/2000 |
| JP | 2003272712 A | 9/2003 |
| JP | 2007288906 A | 11/2007 |

*Primary Examiner* — Redhwan K Mawari
*Assistant Examiner* — Rodney P King
(74) *Attorney, Agent, or Firm* — Dinsmore & Shohl LLP

(57) ABSTRACT

An electronic control unit executes navigation-cooperative SOC control in which traveling situations on a traveling route found through a search performed by a navigation system are predicted and a state-of-charge is controlled by adjusting an output of an engine based on the predicted traveling situations to control charging-discharging of an electricity storage device. The ECU does not execute the navigation-cooperative SOC control when a temperature of the electricity storage device falls below a prescribed temperature and thus charging-discharging of the electricity storage device is limited.

5 Claims, 8 Drawing Sheets

(56) References Cited

U.S. PATENT DOCUMENTS

2009/0321163 A1 12/2009 Suzui
2011/0005212 A1* 1/2011 Matsushita ............. F02D 29/02
  60/299
2015/0019057 A1* 1/2015 Morisaki ................... B60L 7/18
  701/22

* cited by examiner

HYBRID VEHICLE

CROSS-REFERENCE TO RELATED APPLICATIONS

This application claims priority to Japanese Patent Application No. 2016-070377 filed on Mar. 31, 2016 which is incorporated herein by reference in its entirety including the specification, drawings and abstract.

BACKGROUND

1. Technical Field

The disclosure relates to a hybrid vehicle including an engine, an electricity storage device configured to store electric power generated using an output of the engine, and an electric motor configured to generate drive power for traveling, using the electric power received from the electricity storage device.

2. Description of Related Art

Japanese Patent Application Publication No. 2000-32606 (JP 2000-32606 A) describes a technology of enhancing the fuel efficiency of a hybrid vehicle having the foregoing configuration based on the result of a traveling route search performed by a navigation system. In the hybrid vehicle, based on a traveling route determined through the search performed by the navigation system, traveling situations on the traveling route are predicted. Based on the predicted traveling situations, charging-discharging of a battery is predicted. Based on the predicted charging-discharging of the battery, a target state-of-charge (target SOC) of the battery is set. Thus, electric power is supplied from the battery and the battery is charged with regenerated electric power with a high degree of energy efficiency (see JP 2000-32606 A).

SUMMARY

The SOC control executed in cooperation with the navigation system is useful in performing charging-discharging of the battery with a high degree of energy efficiency. However, executing the SOC control unconditionally may reduce the fuel efficiency. Specifically, if the SOC control is executed when the charging-discharging performance of the battery has deteriorated, for example, the operating time of the engine required to charge the battery based on the prediction of the traveling situations may be increased, resulting in reduction in the fuel efficiency. This issue is, however, not studied in JP 2000-32606 A or Japanese Patent Application Publication No. 2003-272712 (JP 2003-272712 A).

The disclosure provides a technology of suppressing reduction in the fuel efficiency of a hybrid vehicle in which SOC control can be executed in cooperation with a navigation system.

A hybrid vehicle according to an aspect of the disclosure includes an engine, an electricity storage device, an electric motor, a controller, and a navigation system. The electricity storage device is configured to store electric power generated using an output of the engine. The electric motor is configured to generate drive power for traveling, using the electric power received from the electricity storage device. The controller is configured to control a state-of-charge (SOC) of the electricity storage device by adjusting the output of the engine to control charging-discharging of the electricity storage device. The navigation system is configured to search for a traveling route of the hybrid vehicle. The controller is configured to predict a traveling situation on the traveling route found through a search performed by the navigation system. The controller is configured to execute navigation-cooperative control for controlling the SOC by controlling charging-discharging of the electricity storage device based on the predicted traveling situation. The controller is configured not to execute the navigation-cooperative control when a temperature of the electricity storage device falls below a prescribed temperature at which charging-discharging of the electricity storage device is limited.

If the navigation-cooperative control is executed when the temperature of the electricity storage device is such a low temperature that charging-discharging of the electricity storage device is limited, there is an increase in the operating time of the engine required to charge the electricity storage device based on the prediction of traveling situation, such as the prediction of a long uphill slope, resulting in reduction in the fuel efficiency. In view of this, according to the above aspect, when the temperature of the electricity storage device is such a low temperature that charging-discharging of the electricity storage device is limited, the navigation-cooperative is not executed. Thus, the above-described undesirable situation can be avoided. Therefore, according to the above aspect of the disclosure, in the hybrid vehicle in which the SOC control can be executed in cooperation with the navigation system, it is possible to suppress reduction in the fuel efficiency due to execution of the navigation-cooperative control.

In the above aspect, the controller may be configured to execute temperature increasing control when the temperature of the electricity storage device falls below the prescribed temperature. The temperature increasing control is control for increasing the temperature of the electricity storage device by repeating charging-discharging of the electricity storage device.

With this configuration, when the temperature of the electricity storage device is such a low temperature that charging-discharging of the electricity storage device is limited, the navigation-cooperative is not executed, and in addition, the temperature increasing control for increasing the temperature of the electricity storage device is executed. Thus, with this configuration, it is possible to promptly recover the charging-discharging performance of the electricity storage device that has been reduced due to a low temperature of the electricity storage device, thereby promptly starting the navigation-cooperative control.

In the above aspect, the controller may be configured to control charging-discharging of the electricity storage device by adjusting the output of the engine such that the SOC of the electricity storage device approaches a target SOC. The controller may be configured to control the SOC by adjusting the target SOC based on the traveling situation when the controller executes the navigation-cooperative control. The controller may be configured to prohibit adjustment of the target SOC based on the traveling situation when the controller does not execute the navigation-cooperative control.

With this configuration, it is possible to execute the navigation-cooperative control just by adjusting the target SOC based on the traveling situation. In addition, it is possible to prevent the navigation-cooperative control from being executed, just by prohibiting adjustment of the target SOC based on the traveling situation.

In the above aspect, in the navigation-cooperative control, when discharging electric power of the electricity storage device is predicted to increase in a first certain traveling section, a target SOC may be increased in a traveling section preceding the first certain section to charge the electricity storage device. In the navigation-cooperative control, when charging electric power of the electricity storage device is predicted to increase in a second certain traveling section, the target SOC may be decreased in a traveling section preceding the second certain section to ensure a vacant capacity of the electricity storage device.

In the above aspect, non-execution of the navigation-cooperative control may be achieved by overwriting a charging-discharging command based on charging-discharging electric power calculated under the navigation-cooperative control with charging-discharging electric power calculated under the temperature increasing control.

According to the above aspect of the disclosure, it is possible to suppress reduction in the fuel efficiency in the hybrid vehicle in which the SOC control can be executed in cooperation with the navigation system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
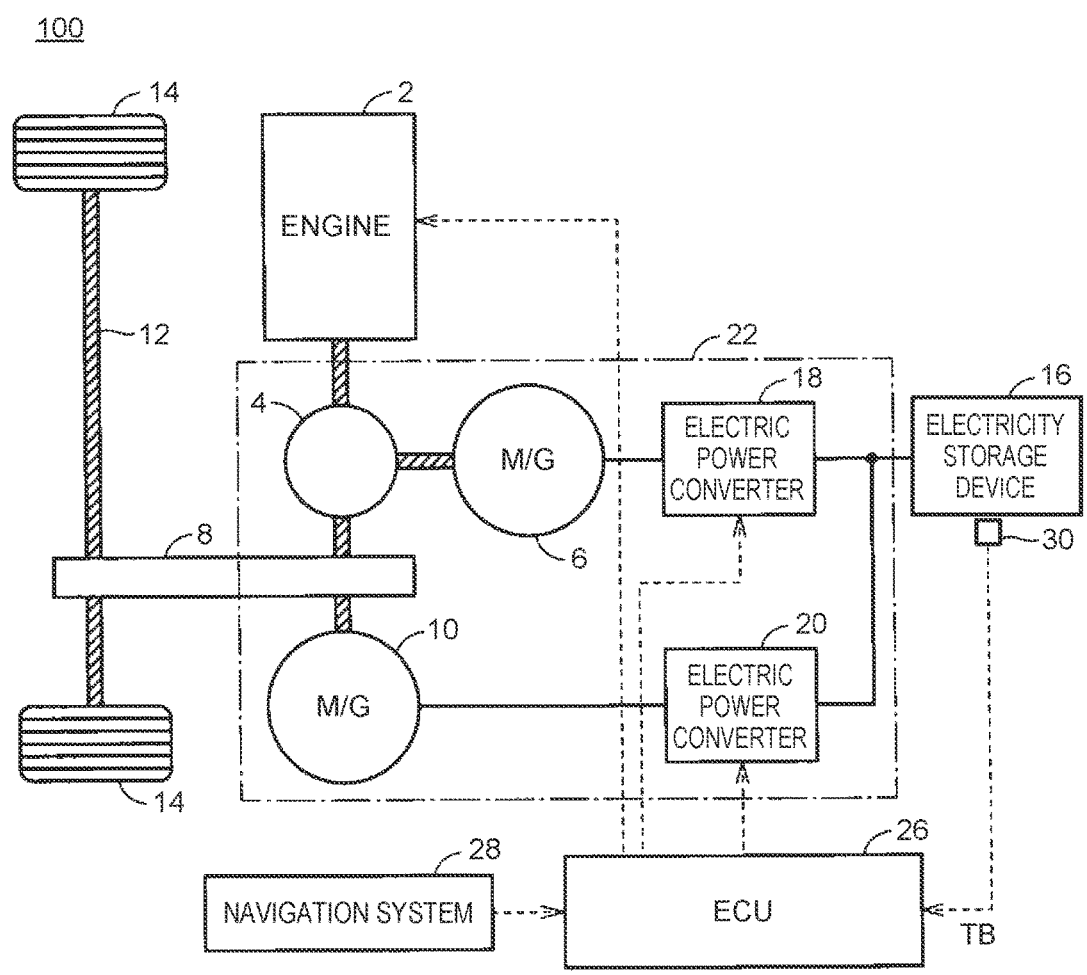
FIG. 1 is a block diagram illustrating the overall configuration of a hybrid vehicle according to a first embodiment of the disclosure.

Hereinafter, embodiments of the disclosure will be described in detail with reference to the accompanying drawings. Identical or equivalent elements will be denoted by the same reference numerals and the description thereof will not be repeated.

First Embodiment

FIG. 1 is a block diagram illustrating the overall configuration of a hybrid vehicle according to a first embodiment of the disclosure. As illustrated in FIG. 1, a hybrid vehicle 100 includes an engine 2, a driving apparatus 22, a transmission gear 8, a driving shaft 12, wheels 14, and an electricity storage device 16. The hybrid vehicle 100 further includes an electronic control unit (ECU) 26, a navigation system 28, and a temperature sensor 30.

The engine 2 is an internal combustion engine configured to output motive power by converting thermal energy generated through combustion of fuel into kinetic energy of a movable element, such as a piston or a rotor. Suitable examples of the fuel for the engine 2 include hydrocarbon fuels, such as gasoline, diesel fuel, ethanol, and natural gas, liquid hydrogen, and liquid or gas hydrogen fuel.

The driving apparatus 22 includes a power split device 4, motor generators 6, 10, and electric power converters 18, 20. Each of the motor generators 6, 10 is an alternating-current (AC) rotary electric machine, such as a three-phase alternating-current (AC) synchronous electric motor including a rotor in which permanent magnets are embedded. The motor generator 6 is used as an electric power generator that is driven by the engine 2 via the power split device 4, and is used also as an electric motor for starting up the engine 2. The motor generator 10 serves mainly as an electric motor to drive the driving shaft 12. On the other hand, when brakes are applied to the hybrid vehicle 100 or when the acceleration of the hybrid vehicle 100 is reduced on a downhill slope, the motor generator 10 serves as an electric power generator to perform regenerative electric power generation.

The power split device 4 includes, for example, a planetary gear mechanism including three rotary shafts, that is, a sun gear, a carrier, and a ring gear. The power split device 4 splits drive power generated by the engine 2 into motive power to be transmitted to a rotary shaft of the motor generator 6 and motive power to be transmitted to the transmission gear 8. The transmission gear 8 is coupled to the driving shaft 12 for driving the wheels 14. The transmission gear 8 is also coupled to a rotary shaft of the motor generator 10.

The electricity storage device 16 is a rechargeable direct-current (DC) power supply, and includes, for example, a secondary battery, such as a nickel-metal-hydride battery or a lithium-ion battery. The electricity storage device 16 supplies electric power to the electric power converters 18, 20. When at least one of the motor generators 6, 10 generates electric power, the electricity storage device 16 is charged with the generated electric power. A large-capacitance capacitor may be used as the electricity storage device 16. The temperature sensor 30 detects a temperature TB of the electricity storage device 16, and outputs a detected value of the temperature TB to the ECU 26.

The state-of-charge (SOC) of the electricity storage device 16 indicates, in percentage, the amount of electricity presently stored in the electricity storage device 16 with respect to the amount of electricity stored in the electricity storage device 16 in a fully charged state. The SOC is calculated, for example, based on at least one of an output voltage from the electricity storage device 16, which is detected by a voltage sensor (not illustrated) and an input-output current of the electricity storage device 16, which is detected by a current sensor (not illustrated). The SOC may be calculated by another electronic control unit (ECU) that is provided for the electricity storage device 16, or may be calculated by the ECU 26 based on at least one of a detected value of the output voltage from the electricity storage device 16 and a detected value of the input-output current of the electricity storage device 16.

The electric power converter 18 performs bidirectional DC-AC power conversion between the motor generator 6 and the electricity storage device 16, based on a control signal received from the ECU 26. Similarly, the electric power converter 20 performs bidirectional DC-AC power conversion between the motor generator 10 and the electricity storage device 16, based on a control signal received from the ECU 26. Thus, each of the motor generators 6, 10 receives electric power from the electricity storage device 16 and operates as an electric motor to output powering torque. Alternatively, each of the motor generators 6, 10 operates as an electric power generator to output regenerative torque thereby supplying electric power to the electricity storage device 16. Each of the electric power converters 18, 20 may be, for example, an inverter. Note that, a step-up converter for DC voltage conversion may be disposed between the electricity storage device 16 and the electric power converters 18, 20.

The ECU 26 includes a central processing unit (CPU), a read-only memory (ROM) in which processing programs and the like are stored, a random-access memory (RAM) in which data is temporarily stored, an input port that receives various signals, and an output port from which various signals are output (all of which are not illustrated). The ECU 26 executes control of various components in the hybrid vehicle 100. The control is not limited to a software process, and may be processed by dedicated hardware (an electronic circuit).

When a traveling load is low and the efficiency of the engine 2 is low, that is, for example, when the hybrid vehicle 100 is being brought to a stop or traveling at a low speed, the ECU 26 stops the engine 2 and controls the electric power converter 20 such that the hybrid vehicle 100 travels using only the motor generator 10 (EV driving mode). When the traveling load increases and the engine 2 can be efficiently operated, the ECU 26 starts up the engine 2 and controls the engine 2 and the electric power converters 18, 20 such that the hybrid vehicle 100 travels using both the engine 2 and the motor generator 10 (HV driving mode).

The ECU 26 executes SOC control for adjusting the SOC of the electricity storage device 16 to a target SOC, by adjusting an output of the engine 2 to control charging-discharging of the electricity storage device 16. The SOC control will be briefly described below.

An output that is required of the engine 2 (required engine power Pe) is expressed by the sum of a power required for traveling of the hybrid vehicle 100 (a traveling power Pr) and a required charging-discharging power Pchg, which is required of the electricity storage device 16. When the required engine power Pe is lower than a prescribed threshold value, the EV driving mode is selected. In the EV driving mode, the engine 2 is stopped and the hybrid vehicle 100 travels using only the motor generator 10. On the other hand, when the required engine power Pe is higher than the prescribed threshold value, the HV driving mode is selected. In the HV driving mode, the engine 2 is operated.

The traveling power Pr is calculated based on the product of a traveling drive power (torque) required for the traveling of the hybrid vehicle 100 and a rotational speed of the driving shaft 12. For example, the traveling drive power (torque) can be calculated based on an operation amount of an accelerator pedal and a vehicle speed.

The required charging-discharging power Pchg indicates a charging-discharging electric power of the electricity storage device 16, and the charging-discharging electric power is used in the SOC control. In the following description, the required charging-discharging power Pchg is set to a value greater than zero (Pchg>0) when discharging of the electricity storage device 16 is prompted, whereas the required charging-discharging power Pchg is set to a value less than zero (Pchg<0) when charging of the electricity storage device 16 is prompted. Therefore, the required engine power Pe, the traveling power Pr, and the required charging-discharging power Pchg satisfy the equation, Pe=Pr−Pchg.

In the SOC control, the required charging-discharging power Pchg (charging-discharging electric power of the electricity storage device 16) is set such that the SOC of the electricity storage device 16 approaches the target SOC. Specifically, when the SOC is lower than the target SOC, the required charging-discharging power Pchg is set to a value less than zero (Pchg<0), so that the required engine power Pe becomes greater than than the traveling power Pr. Thus, the electricity storage device 16 is charged with electric power generated using engine power (corresponding to |Pchg|) that is a surplus with respect to the traveling power Pr. On the other hand, when the SOC is higher than the target SOC, the required charging-discharging power Pchg is set to a value greater than zero (Pchg>0), so that the required engine power Pe becomes less than the traveling power Pr. Thus, the electricity storage device 16 discharges electric power (corresponding to Pchg) which is a deficiency in the engine power with respect to the traveling power Pr.

In this way, the ECU 26 executes the SOC control for adjusting the SOC of the electricity storage device 16 to the target SOC, by adjusting the output of the engine 2 to control charging-discharging of the electricity storage device 16.

The navigation system 28 acquires self-position information using a global positioning system (GPS). Specifically, the navigation system 28 receives radio waves from GPS satellites (not illustrated) to acquire the self-position information. The navigation system 28 has road map information. When a destination of the host vehicle (the hybrid vehicle 100) is set, the navigation system 28 searches for a traveling route from the self-position to the destination based on the road map information. For example, the navigation system 28 has a screen that accepts a touch input, and a user can set a destination on the screen. The navigation system 28 displays a traveling route, which is determined through the search, on the screen, and transmits information about the traveling route, which is determined through the search, to the ECU 26.

The ECU 26 receives the information about the traveling route, which is determined through the search performed by the navigation system 28, from the navigation system 28, and controls the SOC of the electricity storage device 16 based on the received information about the traveling route. Hereinafter, the control of the SOC based on the information about the traveling route, which is found through the search performed by the navigation system 28 will be also referred to as "navigation-cooperative SOC control".

In the navigation-cooperative SOC control, as described in JP 2000-32606 A, traveling situations on a traveling route are predicted based on the information about the traveling route received from the navigation system 28, and charging-discharging of the electricity storage device 16 is predicted based on the predicted traveling situations. The prediction of traveling situations includes, for example, predictions of gradient situations and traffic congestion situations on the traveling route. For example, when a long downhill slope is predicted, the number of times that the electricity storage device 16 is charged with regenerative electric power is predicted to increase, whereas when a long uphill slope is predicted, the number of times that the electricity storage device 16 discharges electric power is predicted to increase. Then, the target SOC of the electricity storage device 16 is adjusted (changed) based on the results of prediction of charging-discharging of the electricity storage device 16, and the SOC is controlled to be adjusted to the adjusted target SOC.

Figure 2:
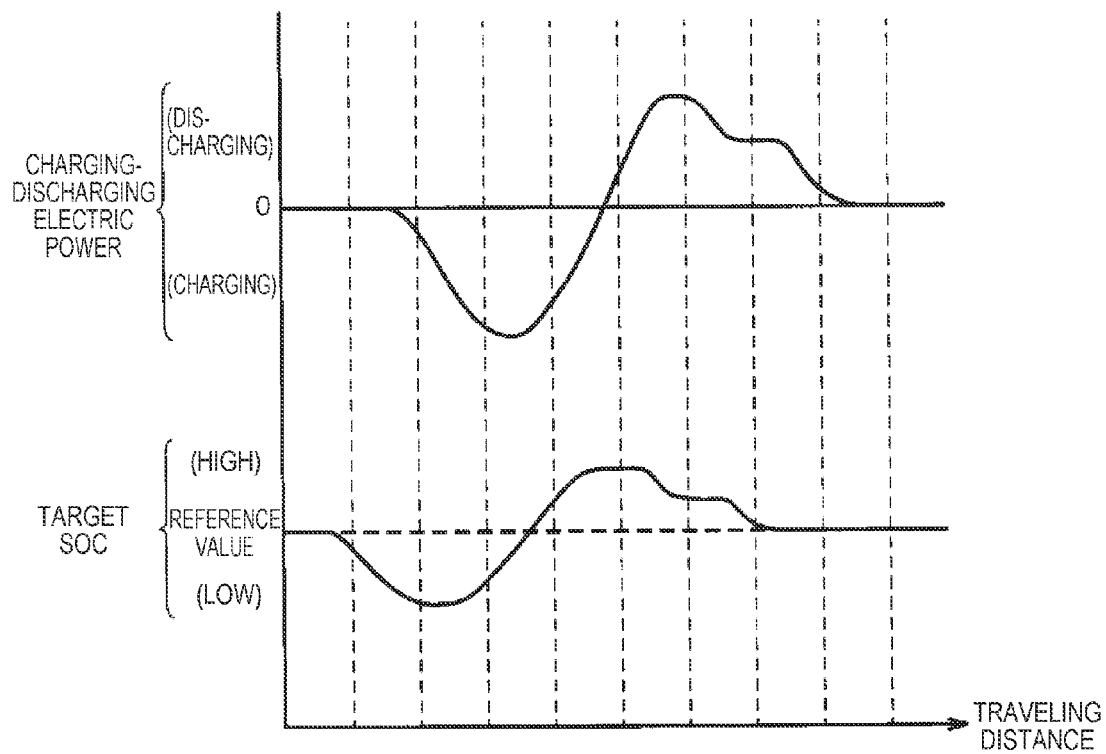
FIG. 2 is a graph illustrating an example of the manner of adjusting a state-of-charge (SOC) through navigation-cooperative SOC control.

FIG. 2 is a graph illustrating an example of how the SOC is adjusted through the navigation-cooperative SOC control. As illustrated in FIG. 2, traveling situations on a traveling route are predicted based on the information about the traveling route from the navigation system 28, and charging-discharging electric power of the electricity storage device 16 at each point on the traveling route is predicted based on the predicted traveling situations. For example, when a long downhill slope is predicted as a result of prediction of traveling situations, charging electric power of the electricity storage device 16 (i.e., electric power supplied to the electricity storage device 16) is predicted to increase, whereas when a long uphill slope is predicted as a result of prediction of traveling situations, discharging electric power of the electricity storage device 16 (i.e., electric power discharged from the electricity storage device 16) is predicted to increase.

Then, the target SOC of the electricity storage device 16 is adjusted based on the prediction of the charging-discharging electric power of the electricity storage device 16. For example, when a traveling route is divided into a plurality of traveling sections having a prescribed length and charging of the electricity storage device 16 in a certain traveling section is predicted, the target SOC is decreased in a traveling section preceding the certain traveling section. Thus, the vacant capacity of the electricity storage device 16 increases, and the electricity storage device 16 can be sufficiently charged with regenerative electric power in the charging traveling section. On the other hand, when discharging of the electricity storage device 16 in a certain traveling section is predicted, the target SOC is increased in a raveling section preceding the certain traveling section. Thus, the amount of electric power stored in the electricity storage device 16 increases, and the electricity storage device 16 can sufficiently discharge electric power in the discharging traveling section.

As described above, through the navigation-cooperative SOC control, it is possible to perform charging-discharging of the electricity storage device 16 with a high degree of energy efficiency. However, executing the navigation-cooperative SOC control unconditionally may reduce the fuel efficiency. Specifically, if the navigation-cooperative SOC control is executed when the charging-discharging performance of the electricity storage device 16 has deteriorated, for example, the operating time of the engine 2 required to charge the electricity storage device 16 through the navigation-cooperative SOC control may be increased, resulting in reduction in the fuel efficiency.

Figure 3:
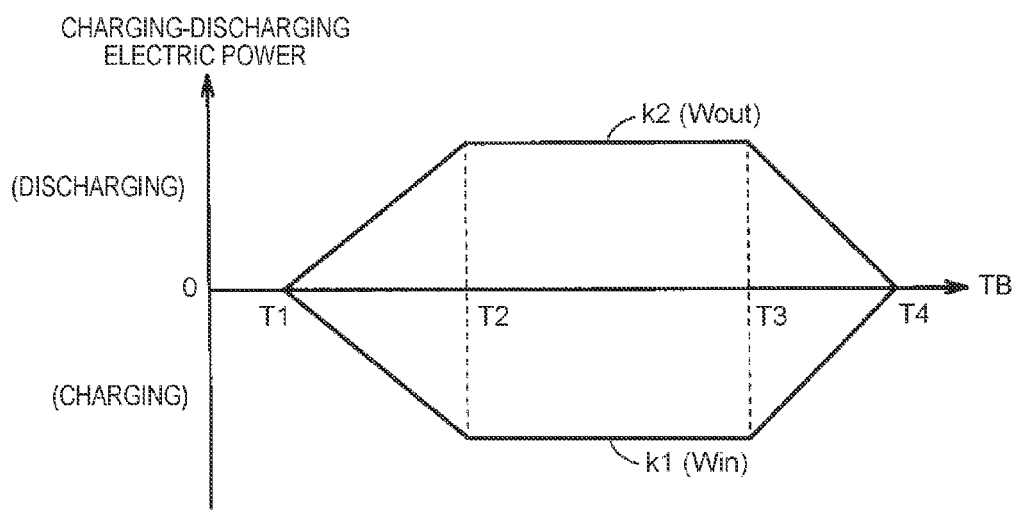
FIG. 3 is a graph illustrating the temperature dependency of charging-discharging performance of an electricity storage device.

FIG. 3 is a graph illustrating the temperature dependency of the charging-discharging performance of the electricity storage device 16. As illustrated in FIG. 3, the abscissa axis represents the temperature TB of the electricity storage device 16. The ordinate axis represents the charging-discharging electric power of the electricity storage device 16. In FIG. 3, a negative value of electric power indicates charging, and a positive value of electric power indicates discharging.

A line k1 represents an allowable charging electric power Win of the electricity storage device 16. The allowable charging electric power Win is a maximum value of the electric power input into the electricity storage device 16 (charging electric power). When the temperature TB of the electricity storage device 16 becomes low, the allowable charging electric power Win is limited. An allowable discharging electric power Wout is a maximum value of the electric power output from the electricity storage device 16 (discharging electric power). When the temperature TB of the electricity storage device 16 becomes low, the allowable discharging electric power Wout is limited.

FIG. 3 illustrates an example in which both the allowable charging electric power Win and the allowable discharging electric power Wout are limited to smaller values when the temperature TB of the electricity storage device 16 falls below a temperature T2, than when the temperature TB is equal to or higher than the temperature T2 (and equal to or lower than a temperature T3). However, the temperature at which limitation of the allowable charging electric power Win is started in response to a temperature decrease need not be the same as the temperature at which limitation of the allowable discharging electric power Wout is started in response to a temperature decrease. When the temperature of the electricity storage device 16 becomes high, the allowable charging electric power Win and the allowable discharging electric power Wout are limited.

In this way, charging-discharging of the electricity storage device 16 is limited when the temperature TB of the electricity storage device 16 is low. Executing the navigation-cooperative SOC control in such a situation raises the following problem. For example, in the navigation-cooperative SOC control, when a long uphill slope is predicted as a traveling situation, discharging electric power of the electricity storage device 16 is predicted to increase, and therefore an output of the engine 2 is increased (or the engine 2 is started up when the engine 2 has been at a standstill) to charge the electricity storage device 16, in order to increase the SOC in advance.

However, when the temperature TB of the electricity storage device 16 is low, the allowable charging electric power Win is limited, and thus the operating time of the engine 2 required to increase the SOC to a required value increases, resulting in reduction in the fuel efficiency of the engine 2. In addition, when the temperature TB of the electricity storage device 16 is low, the internal resistance of the electricity storage device 16 increases, and thus a loss due to charging-discharging of the electricity storage device 16 also increases. When charging-discharging of the electricity storage device 16 is actively performed through the navigation-cooperative SOC control in such a situation (when the temperature TB of the electricity storage device 16 is low), the fuel efficiency is reduced, resulting in reduction in the energy efficiency of the hybrid vehicle 100 as a whole.

In view of this, in the hybrid vehicle 100 according to the first embodiment, the navigation-cooperative SOC control is not executed when the temperature TB of the electricity storage device 16 is low. Thus, it is possible to prevent reduction in the fuel efficiency that will occur if the navigation-cooperative SOC control is executed when the temperature of the electricity storage device 16 is such a low temperature that charging-discharging of the electricity storage device 16 is limited.

Figure 4:
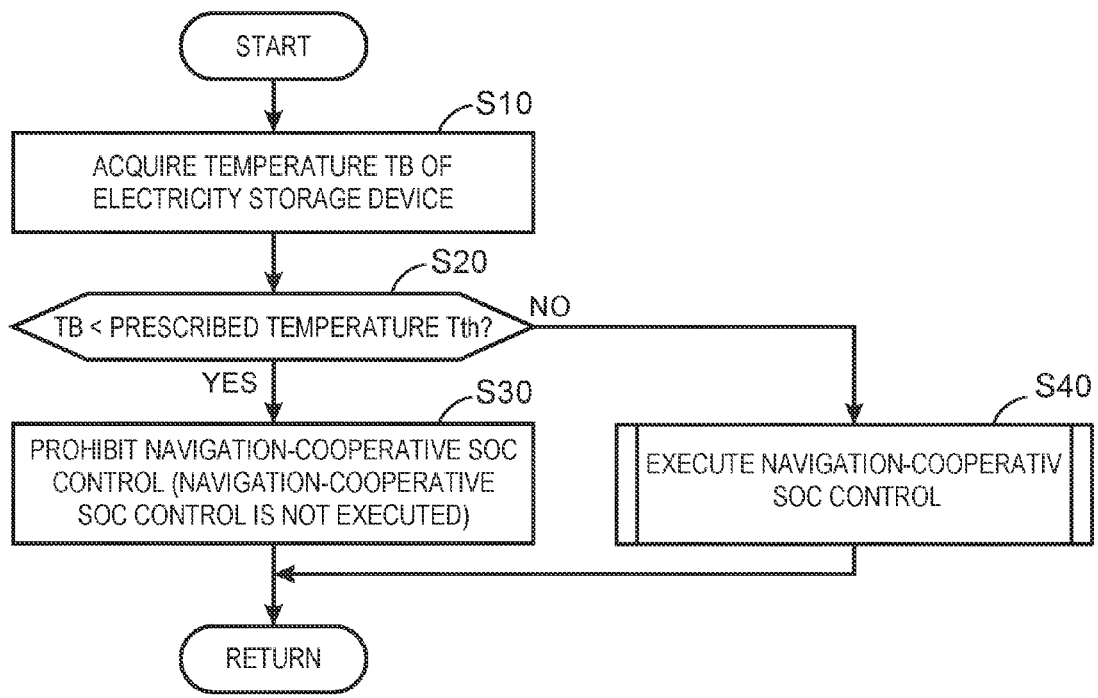
FIG. 4 is a flowchart illustrating a process executed by an electronic control unit (ECU) in FIG. 1.

FIG. 4 is a flowchart illustrating a process executed by the ECU 26 in FIG. 1. The process in the flowchart is invoked from a main routine to be executed at prescribed time intervals or when a prescribed condition is satisfied.

As illustrated in FIG. 4, the ECU 26 acquires a temperature TB of the electricity storage device 16 from the temperature sensor 30 (see FIG. 1) (step S10). The ECU 26 then determines whether the temperature TB is lower than a prescribed temperature Tth (step S20). As described above, if the navigation-cooperative SOC control is executed when the temperature of the electricity storage device 16 is such a low temperature that charging-discharging of the electricity storage device 16 is limited, the fuel efficiency is reduced. The prescribed temperature Tth is a temperature for determining whether the temperature TB of the electricity storage device 16 has been decreased to such a low temperature that the fuel efficiency is reduced. For example, the prescribed temperature Tth is set, as appropriate, to a temperature between the temperature T1 and the temperature T2 illustrated in FIG. 3.

When the ECU 26 determines in step S20 that the temperature TB is lower than the prescribed temperature Tth (YES in step S20), the ECU 26 prohibits execution of the navigation-cooperative SOC control (step S30). In other words, the ECU 26 does not execute the navigation-cooperative SOC control. Thus, it is possible to prevent reduction in the fuel efficiency that will occur if the navigation-cooperative SOC control is executed when the temperature of the electricity storage device 16 is low.

On the other hand, when the ECU 26 determines in step S20 that the temperature TB is equal to or higher than the prescribed temperature Tth (NO in step S20), the ECU 26 executes the navigation-cooperative SOC control (step S40). Thus, the navigation-cooperative SOC control is executed when the temperature TB of the electricity storage device 16 is not low. This enables efficient management of charging-discharging through the navigation-cooperative SOC control.

Figure 5:
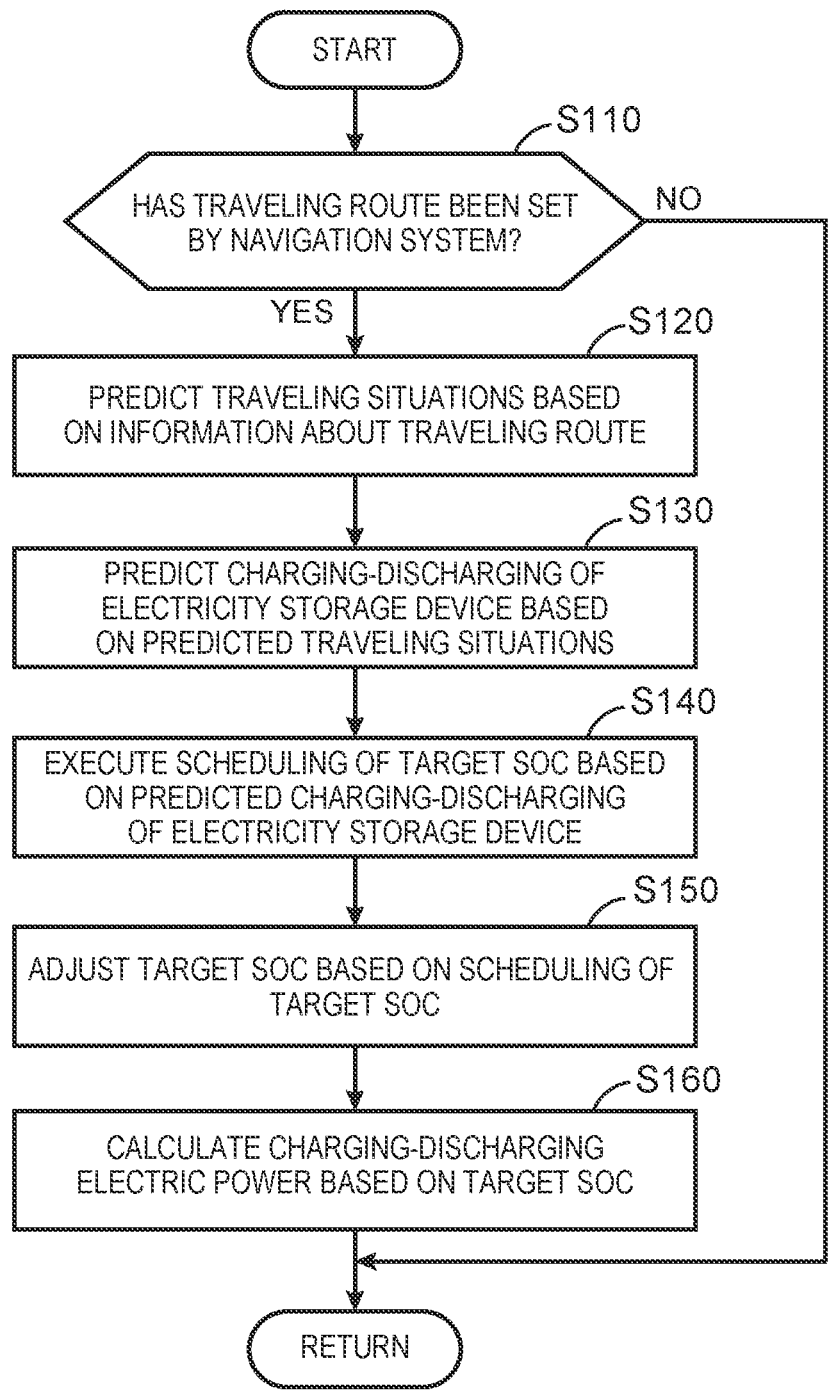
FIG. 5 is a flowchart illustrating a procedure of the navigation-cooperative SOC control executed in step S40 in FIG. 4.

FIG. 5 is a flowchart illustrating a procedure of the navigation-cooperative SOC control executed in step S40 in FIG. 4. A series of processes illustrated in the flowchart is repeatedly executed at prescribed time intervals during execution of step S40 in FIG. 4.

As illustrated in FIG. 5, the ECU 26 determines whether a traveling route has been set in the navigation system 28 (step S110). The traveling route is set (searched for) when a user inputs a destination in the navigation system 28. When no traveling route has been set in the navigation system 28 (NO in step S110), the subsequent processes are not executed and the process proceeds to RETURN.

When the ECU 26 determines in step S110 that a traveling route has been set (YES in step S110), the ECU 26 predicts traveling situations on the traveling route based on information about the traveling route (step S120). The prediction of the traveling situations includes predictions of, for example, a gradient situation, a traffic congestion situation, the position of an intersection, the position of an expressway, and a road surface situation at each point on the traveling route. For example, when the number of uphill slopes is predicted to be large (or an uphill slope is predicted to be long) or when a traffic congestion is predicted, discharging of the electricity storage device 16 is predicted to increase. On the other hand, when the number of downhill slopes is predicted to be large (or a downhill slope is predicted to be long), regenerative charging of the electricity storage device 16 is predicted to increase.

The ECU 26 then predicts charging-discharging of the electricity storage device 16 based on the predicted traveling situations (step S130). Specifically, the ECU 26 predicts the charging-discharging electric power of the electricity storage device 16 at each point on the traveling route based on the predicted traveling situations. For example, the discharging electric power is predicted to increase on an uphill slope, and the charging electric power due to regenerative braking is predicted to increase on a downhill slope. As illustrated in the example in FIG. 2, the charging-discharging electric power at each point on the traveling route is predicted in association with a traveling distance from the present position.

Next, the ECU 26 executes scheduling of the target SOC of the electricity storage device 16 based on the predicted charging-discharging of the electricity storage device 16 (step S140). Specifically, when the discharging electric power of the electricity storage device 16 is predicted to increase in a certain traveling section, the target SOC is increased in a traveling section preceding the certain traveling section to charge the electricity storage device 16 sufficiently. On the other hand, when the charging electric power of the electricity storage device 16 is predicted to increase in a certain traveling section, the target SOC is decreased in a traveling section preceding the certain traveling section to secure a sufficient vacant capacity of the electricity storage device 16. For example, as illustrated in FIG. 2, on the basis of the prediction of charging-discharging of the electricity storage device 16, the ECU 26 executes scheduling of the target SOC based on a traveling distance from the present position.

Subsequently, the ECU 26 adjusts the target SOC of the electricity storage device 16 based on the scheduling of the target SOC (step S150). Specifically, a target SOC based on the scheduling of the target SOC is set at each point on the traveling route. The ECU 26 then calculates charging-discharging electric power of the electricity storage device 16 based on the set target SOC (step S160). Specifically, the ECU 26 calculates a present SOC. Then, based on the deviation between the present SOC and the target SOC, the ECU 26 calculates a required charging-discharging power Pchg such that the required charging-discharging power Pchg exceeds neither the allowable charging electric power Win nor the allowable discharging electric power Wout.

As described above, according to the first embodiment, the navigation-cooperative SOC control is not executed when the temperature of the electricity storage device 16 is such a low temperature that charging-discharging of the electricity storage device 16 is limited. Thus, it is possible to prevent reduction in the fuel efficiency that will occur if the navigation-cooperative SOC control is executed when the temperature of the electricity storage device 16 is low.

Second Embodiment

As described above, if the navigation-cooperative SOC control is executed when the temperature of the electricity storage device 16 is such a low temperature that charging-discharging of the electricity storage device 16 is limited, the fuel efficiency is reduced. In view of this, the navigation-cooperative SOC control is not executed when the temperature of the electricity storage device 16 is low, in the first embodiment. In a second embodiment, when the temperature of the electricity storage device 16 is such a low temperature that charging-discharging of the electricity storage device 16 is limited, the navigation-cooperative SOC control is not executed, and in addition, the temperature of the electricity storage device 16 is actively increased. This makes it possible to promptly recover the charging-discharging performance of the electricity storage device 16 that has been reduced due to a low temperature of the electricity storage device 16, thereby promptly starting the navigation-cooperative SOC control to enhance the fuel efficiency.

In the hybrid vehicle 100 according to the second embodiment, when the temperature TB of the electricity storage device 16 is lower than the prescribed temperature Tth, the ECU 26 executes control for increasing temperature of the electricity storage device 16 by repeating charging-discharging of the electricity storage device 16. Hereinafter, the control for increasing the temperature of the electricity storage device 16 will be referred to as "temperature increasing control".

For example, during execution of the temperature increasing control, the ECU 26 causes the target SOC of the electricity storage device 16 to increase to exceed a reference value (e.g., 60%) and decrease to fall below the reference value. Thus, while the target SOC is increased, the output of the engine 2 is increased (or the engine is started up when the engine 2 has been at a standstill) to cause the SOC to follow the increased target SOC, so that charging of the electricity storage device 16 is performed. On the other hand, while the target SOC is decreased, the output of the engine 2 is decreased (or the engine 2 is stopped) to cause the SOC to follow the decreased target SOC, so that discharging of the electricity storage device 16 is performed. By actively repeating charging-discharging of the electricity storage device 16 in this way, it is possible to directly increase the temperature of the electricity storage device 16 using the internal resistance of the electricity storage device 16.

It is possible to repeatedly perform charging-discharging of the electricity storage device 16 by setting the required charging-discharging power Pchg of the electricity storage device 16 alternately to an appropriate positive value and an appropriate negative value, instead of increasing and decreasing the target SOC.

Figure 6:
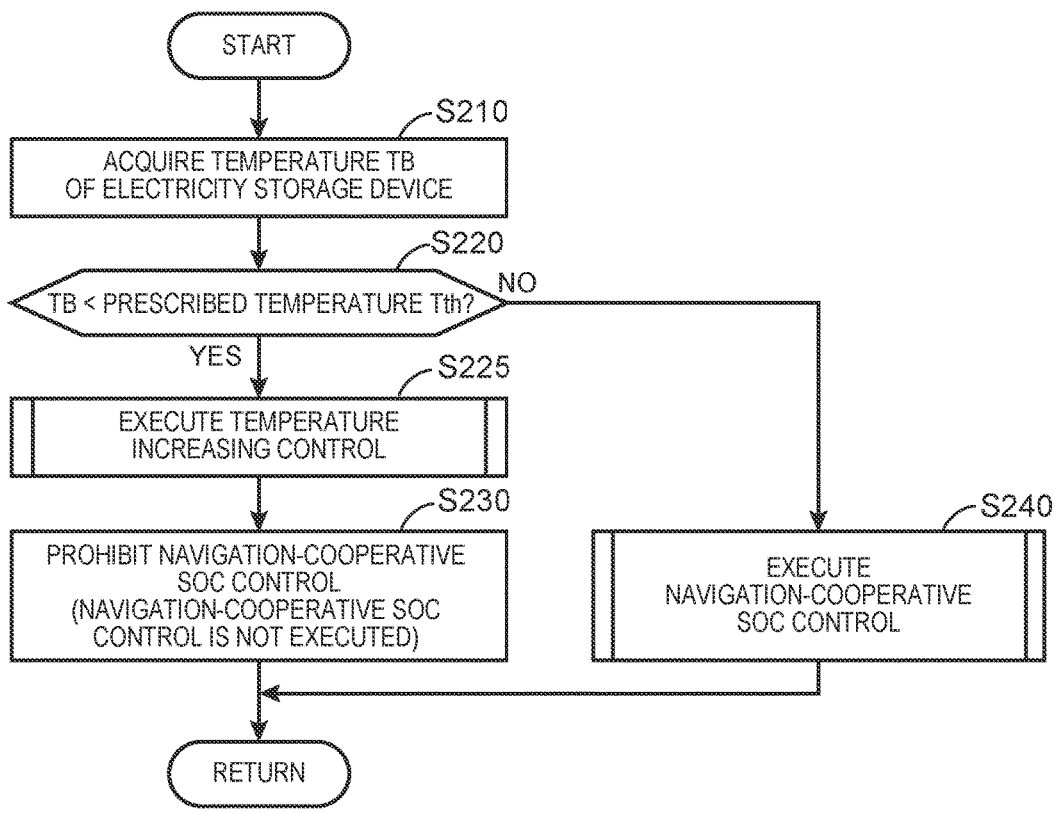
FIG. 6 is a flowchart illustrating a process executed by the ECU in a second embodiment of the disclosure.

FIG. 6 is a flowchart illustrating a process executed by the ECU 26 in the second embodiment. The process illustrated in the flowchart is also invoked from a main routine to be executed at prescribed time intervals or when a prescribed condition is satisfied.

As illustrated in FIG. 6, the ECU 26 acquires a temperature TB of the electricity storage device 16 from the temperature sensor 30 (see FIG. 1) (step S210). The ECU 26 then determines whether the temperature TB is lower than a prescribed temperature Tth (step S220). As described above, the prescribed temperature Tth is a temperature for determining whether the temperature TB of the electricity storage device 16 has been decreased to such a low temperature that the fuel efficiency is reduced.

When the ECU 26 determines in step S220 that the temperature TB is lower than the prescribed temperature Tth (YES in step S220), the ECU 26 executes the temperature increasing control for increasing the temperature of the electricity storage device 16 (step S225). A concrete procedure of the temperature increasing control will be described later in detail. The ECU 26 then prohibits execution of the navigation-cooperative SOC control (see FIG. 4) (step S230). In other words, the ECU 26 does not execute the navigation-cooperative SOC control.

On the other hand, when the ECU 26 determines in step S220 that the temperature TB is equal to or higher than the prescribed temperature Tth (NO in step S220), the ECU 26 executes the navigation-cooperative SOC control (step S240). Thus, the navigation-cooperative SOC control is executed when the temperature TB of the electricity storage device 16 is not low. This enables efficient management of charging-discharging through the navigation-cooperative SOC control.

As described above, when the temperature of the electricity storage device 16 is low, execution of the navigation-cooperative SOC control is prohibited and the temperature increasing control is executed. Then, when the temperature of the electricity storage device 16 is increased through the temperature increasing control, the navigation-cooperative SOC control is executed.

Figure 7:
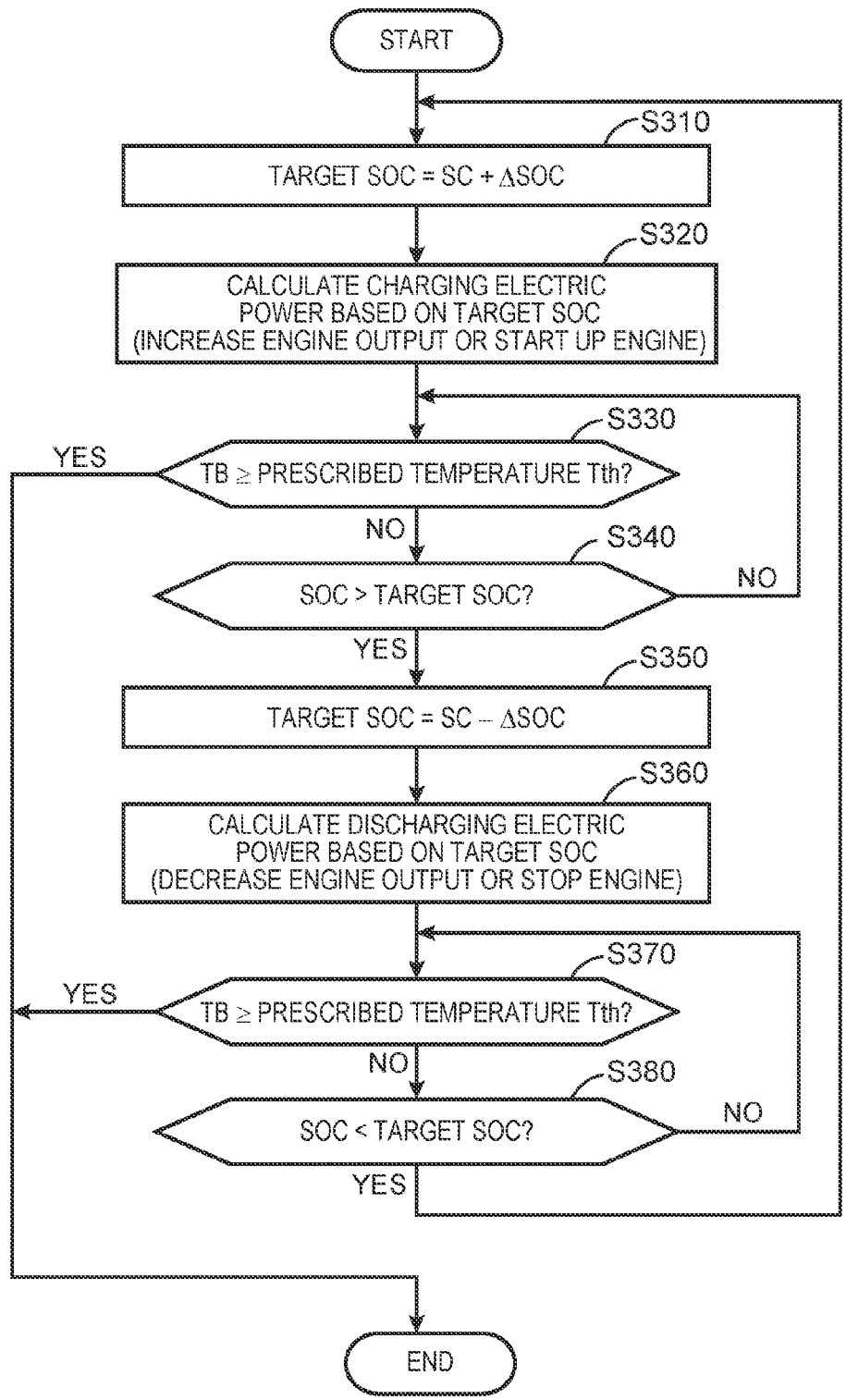
FIG. 7 is a flowchart illustrating a procedure of temperature increasing control executed in step S225 in FIG. 6.

FIG. 7 is a flowchart illustrating a procedure of the temperature increasing control executed in step S225 in FIG. 6. A series of processes illustrated in the flowchart is repeatedly executed at prescribed time intervals during execution of step S225 in FIG. 6.

As illustrated in FIG. 7, the ECU 26 increases the target SOC of the electricity storage device 16 to a value that is higher than a reference value SC (e.g., 60%) by a prescribed amount $\Delta$SOC (e.g. $\Delta$SOC=10%) (step S310). The ECU 26 then calculates a charging electric power of the electricity storage device 16 based on the increased target SOC (step S320). Thus, the output of the engine 2 is increased (or the engine is started up when the engine 2 has been at a standstill).

Next, the ECU 26 determines whether the temperature TB of the electricity storage device 16 is equal to or higher than the prescribed temperature Tth (step S330). When the ECU 26 determines that the temperature TB is equal to or higher than the prescribed temperature Tth (YES in step S330), the subsequent processes are not executed, and the process proceeds to END, so that the temperature increasing control ends.

On the other hand, when the ECU 26 determines in step S330 that the temperature TB is lower than the prescribed temperature Tth (NO in step S330), the ECU 26 determines whether the SOC of the electricity storage device 16 has exceeded the target SOC increased in step S310 (step S340). When the SOC is equal to or lower than the target SOC (NO in step S340), the process returns to step S330.

On the other hand, when the ECU 26 determines in step S340 that the SOC has exceeded the target SOC (YES in step S340), the ECU 26 sets the target SOC to a value that is lower than the reference value SC by the prescribed amount $\Delta$SOC (step S350). The ECU 26 then calculates discharging electric power of the electricity storage device 16 based on the decreased target SOC (step S360). Thus, the output of the engine 2 is decreased (or the engine is stopped).

Next, the ECU 26 determines whether the temperature TB of the electricity storage device 16 is equal to or higher than the prescribed temperature Tth (step S370). When the ECU 26 determines that the temperature TB is equal to or higher than the prescribed temperature Tth (YES in step S370), the subsequent processes are not executed, and the process proceeds to END, so that the temperature increasing control ends.

On the other hand, when the ECU 26 determines in step S370 that the temperature TB is lower than the prescribed temperature Tth (NO in step S370), the ECU 26 determines whether the SOC of the electricity storage device 16 has fallen below the target SOC decreased in step S350 (step S380). When the SOC is equal to or higher than the target SOC (NO in step S380), the process returns to step S370. On the other hand, when the ECU 26 determines that the SOC has fallen below the target SOC (YES in step S380), the process returns to step S310.

In the flowchart described above, the target SOC is first increased to be higher than the reference value SC. Alternatively, the target SOC may be first decreased to be lower than the reference value SC.

As described above, in the second embodiment, when the temperature of the electricity storage device 16 is such a low temperature that charging-discharging of the electricity storage device 16 is limited, the navigation-cooperative SOC control is not executed, and in addition, the temperature increasing control for actively increasing the temperature of the electricity storage device 16 is executed. Therefore, according to the second embodiment, it is possible to promptly recover the charging-discharging performance of the electricity storage device 16 that has been reduced due to a low temperature of the electricity storage device 16, thereby promptly starting the navigation-cooperative SOC control.

Modified Example of Second Embodiment

In the second embodiment, it is first determined whether the temperature TB of the electricity storage device 16 is lower than the prescribed temperature Tth. When the temperature TB is lower than the prescribed temperature Tth, the temperature increasing control is executed and the navigation-cooperative SOC control is prohibited. On the other hand, when the temperature TB is equal to or higher than the prescribed temperature Tth, the navigation-cooperative SOC control is executed.

A modified example of the second embodiment differs from the second embodiment in the process flow. Specifically, in the modified example, the process of the navigation-cooperative SOC control illustrated in FIG. 5 is regularly executed. However, when the temperature TB of the electricity storage device 16 is lower than the prescribed temperature Tth, the charging-discharging electric power calculated in the temperature increasing control illustrated in FIG. 7 is employed as a final charging-discharging command. Thus, when the temperature of the electricity storage device 16 is low, the temperature increasing control is executed and non-execution of the navigation-cooperative SOC control is substantially achieved.

Figure 8:
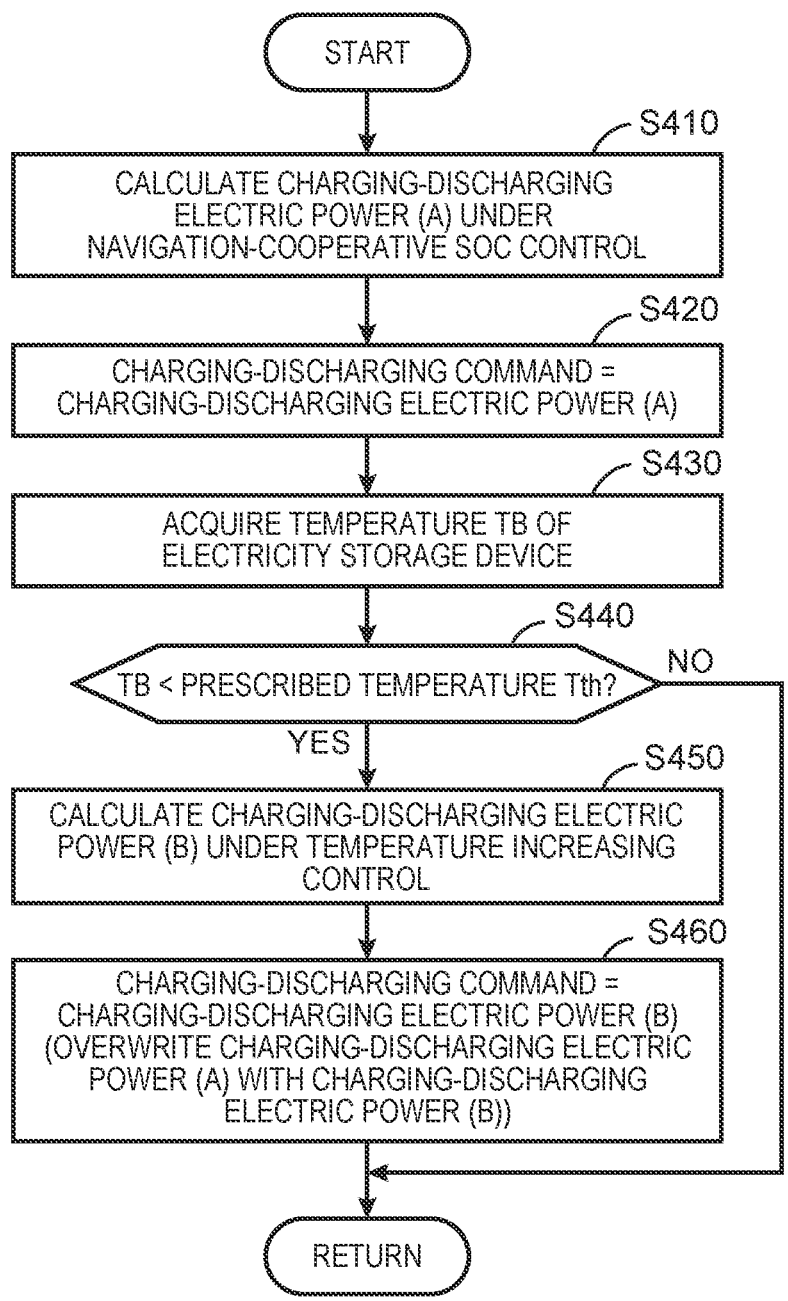
FIG. 8 is a flowchart illustrating a process executed by the ECU in a modified example of the second embodiment.

FIG. 8 is a flowchart illustrating a process executed by the ECU 26 in the modified example. The process illustrated by the flowchart is also invoked from a main routine to be executed at prescribed time intervals or when a prescribed condition is satisfied.

As illustrated in FIG. 8, the ECU 26 calculates charging-discharging electric power under the navigation-cooperative SOC control (hereinafter, referred to as "charging-discharging electric power (A)"), according to the procedure illustrated in FIG. 5 (step S410). Next, the ECU 26 sets the calculated charging-discharging electric power (A) as a charging-discharging command for the electricity storage device 16 (step S420).

Subsequently, the ECU 26 acquires a temperature TB of the electricity storage device 16 from the temperature sensor 30 (see FIG. 1) (step S430). The ECU 26 then determines whether the temperature TB is lower than the prescribed temperature Tth (step S440).

When the ECU 26 determines that the temperature TB is lower than the prescribed temperature Tth (YES in step S440), the ECU 26 calculates charging-discharging electric power under the temperature increasing control (hereinafter, referred to as "charging-discharging electric power (B)"), according to the procedure illustrated in FIG. 7 (step S450). The ECU 26 then sets the calculated charging-discharging electric power (B) as a charging-discharging command for the electricity storage device 16 (step S460). In other words, the ECU 26 overwrites the charging-discharging command based on the charging-discharging electric power (A) calculated under the navigation-cooperative SOC control, with the charging-discharging electric power (B) calculated under the temperature increasing control. Although not illustrated, in this case, adjustment of the target SOC under the navigation-cooperative SOC control is not executed (step S150 in FIG. 5).

On the other hand, when the ECU 26 determines in step S440 that the temperature TB is equal to or higher than the prescribed temperature Tth (NO in step S440), the processes in steps S450, S460 are not executed, and the process proceeds to RETURN. In other words, when the temperature TB is equal to or higher than the prescribed temperature Tth, the charging-discharging electric power (A) calculated under the navigation-cooperative SOC control is set as a final charging-discharging command.

The function achieved by the modified example is the same as the function achieved by the second embodiment. That is, in the modified example as well, when the temperature of the electricity storage device 16 is such a low temperature that charging-discharging of the electricity storage device 16 is limited, the navigation-cooperative SOC is not executed, and in addition, the temperature increasing control for increasing the temperature of the electricity storage device 16 is executed. Therefore, the modified example produces the same advantageous effects as those of the second embodiment.

In the foregoing embodiments, description is provided on the controls in the hybrid vehicle 100 (see FIG. 1) having the configuration in which the engine 2 is coupled to the two motor generators 6, 10 via the power split device 4. However, hybrid vehicles to which the disclosure is applied are not limited to the hybrid vehicle 100 having the foregoing configuration.

Figure 9:
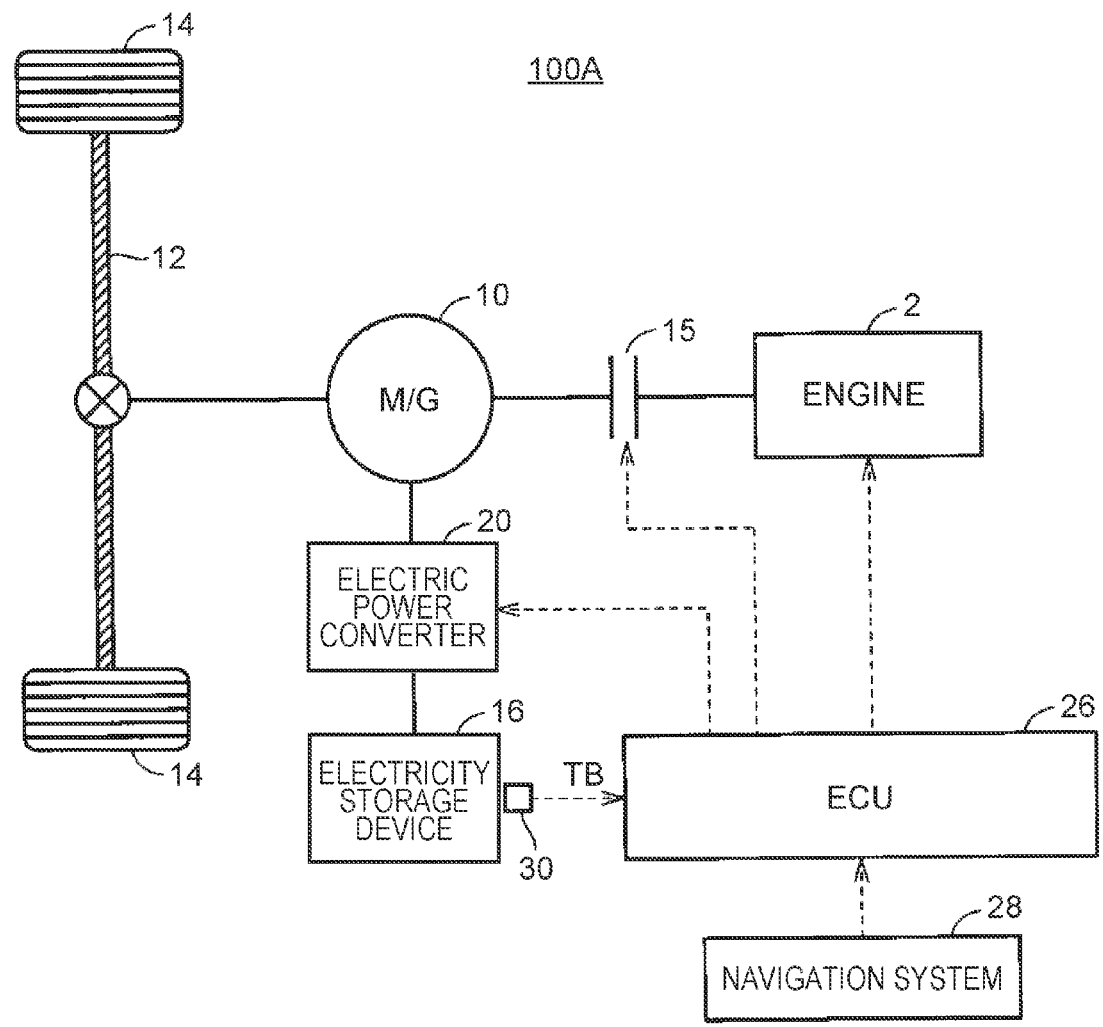
FIG. 9 is a block diagram illustrating a modified example of the overall configuration of a hybrid vehicle.

For example, the controls described in the foregoing embodiments can be applied to a hybrid vehicle 100A having a configuration in which the engine 2 and one motor generator 10 are coupled tandemly to each other via a clutch 15 as illustrated in FIG. 9.

In addition, although not illustrated, the embodiments can be applied to a so-called series-hybrid vehicle in which the engine 2 is used only to drive the motor generator 6, and only the motor generator 10 generates drive power of the vehicle.

In the foregoing description, the motor generator 10 is an example of "electric motor" in the disclosure, and the ECU 26 is an example of "controller" in the disclosure.

The embodiments that have been described in the specification are to be considered in all respects as illustrative and not restrictive. The technical scope is defined by claims, and all changes which come within the meaning and range of equivalency of the claims are therefore intended to be embraced therein.

What is claimed is:
1. A hybrid vehicle comprising:
an engine;
an electricity storage device configured to store electric power generated using an output of the engine;
an electric motor configured to generate drive power for traveling, using the electric power received from the electricity storage device;
a controller configured to control a state-of-charge of the electricity storage device by adjusting the output of the engine to control charging-discharging of the electricity storage device; and
a navigation system configured to search for a traveling route of the hybrid vehicle, wherein
the controller is configured to predict a traveling situation on the traveling route found through a search performed by the navigation system, the controller is configured to execute navigation-cooperative control for controlling the state-of-charge by controlling charging-discharging of the electricity storage device based on the predicted traveling situation, the controller is configured not to execute the navigation-cooperative control when a temperature of the electricity storage device falls below a prescribed temperature at which charging-discharging of the electricity storage device is limited, the controller is configured to control the state-of-charge of the electricity storage device so that the state-of-charge of the electricity storage device is adjusted to a target state-of-charge, the controller is configured to set the target state-of-charge based on the predicted traveling situation on the traveling route, and the controller is configured to execute temperature increasing control when the temperature of the electricity storage device falls below the prescribed temperature, the temperature increasing control including increasing the target state-of-charge to exceed a reference value and decreasing the target state-of-charge to fall below the reference value.

2. The hybrid vehicle according to claim 1, wherein the temperature increasing control being control for increasing the temperature of the electricity storage device by repeating charging-discharging of the electricity storage device.

3. The hybrid vehicle according to claim 2, wherein non-execution of the navigation-cooperative control is achieved by overwriting a charging-discharging command based on charging-discharging electric power calculated under the navigation-cooperative control with charging-discharging electric power calculated under the temperature increasing control.

4. The hybrid vehicle according to claim 1, wherein:
the controller is configured to control charging-discharging of the electricity storage device by adjusting the output of the engine such that the state-of-charge of the electricity storage device approaches target state-of-charge;

the controller is configured to control the state-of-charge by adjusting the target state-of-charge based on the traveling situation when the controller executes the navigation-cooperative control; and the controller is configured to prohibit adjustment of the target state-of-charge based on the traveling situation when the controller does not execute the navigation-cooperative control.

5. The hybrid vehicle according to claim 1, wherein:
in the navigation-cooperative control, when discharging electric power of the electricity storage device is predicted to increase in a first certain traveling section, the target state-of-charge is increased in a traveling section preceding the first certain section to charge the electricity storage device; and in the navigation-cooperative control, when charging electric power of the electricity storage device is predicted to increase in a second certain traveling section, the target state-of-charge is decreased in a traveling section preceding the second certain section to ensure a vacant capacity of the electricity storage device.

* * * * *